(No Model.)

J. C. COVERT.
CHAIN CONNECTION FOR HARNESS.

No. 319,958. Patented June 16, 1885.

ATTEST:
Sidney M. Smith
Jos. Seeberger

INVENTOR:
James C. Covert
PER H. Lisle Fleming
ATTY.

N. PETERS, Photo-Lithographer, Washington, D. C.

UNITED STATES PATENT OFFICE.

JAMES C. COVERT, OF WEST TROY, NEW YORK.

CHAIN-CONNECTION FOR HARNESS.

SPECIFICATION forming part of Letters Patent No. 319,958, dated June 16, 1885.

Application filed June 23, 1884. (No model.)

*To all whom it may concern:*

Be it known that I, JAMES C. COVERT, of West Troy, in the county of Albany and State of New York, have invented a new and useful Improvement in Chain-Connections, of which the following is a specification.

This invention relates to devices for connecting chains, more especially in certain parts of a harness—as for instance, in breast-chains—and for this purpose is intended as an improvement upon previous inventions that are the subject of Letters Patent No. 274,723, issued to me March 27, 1883, the device being the principal feature of an improved combination and being adapted for separate attachment to and removal from hame-rings, and by reason of its special construction, hereinafter more fully described, for use in sets or pairs arranged as rights and lefts, and for molding and casting without a core, my object being to simplify and perfect the operation and reduce the cost of manufacture.

Figure 1:
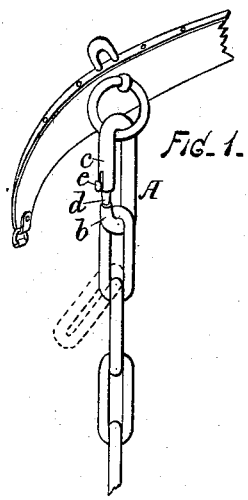
Figure 2:
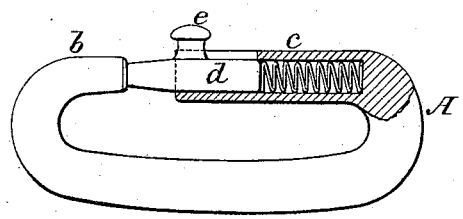

In the drawings, Figure 1 illustrates my improvement as applied to breast-chains; and Fig. 2 is an enlarged view of connecting device separately, partly in section.

Similar letters of reference in each indicate corresponding parts.

A represents the body of an open chain-link, the smaller portion or end of which may be slightly tapered to form the hook $b$, the larger portion, $c$, of open side having cavity or chamber therein to receive the longitudinally-sliding bolt $d$, and a spring for extending the same to close the opening, said bolt being provided with the thumb-piece or knob $e$, by means of which it may be retracted, a suitable slot being provided to permit passage of knob in so doing.

This device, as far as the construction and operation of the bolt, knob, and spring are concerned, is precisely similar to the snap-hook previously patented by me and employed in connecting breast-chains with hame-rings, as set forth in Letters Patent hereinbefore mentioned, but differs insomuch that these operative parts are applied to a body having the form of a chain-link, as aforesaid, corresponding substantially with the links of chains combined therewith, which form fits it more completely for the special purpose for which it is intended on account of its adaptation for being separately attached to and detached from hame-ring, instead of the permanent attachment necessitated in said snap-hook having connection therewith by means of a closed end loop. It is preferable that the slot should be located on the side of the spring and bolt chamber, (though I do not confine myself to this form of construction,) so that the snap-links may be made up in sets or pairs, rights and lefts, the link to be used on the right hame-ring having slot on left side, and the link for the opposite or left hame-ring having slot on right side, which arrangement admits of more convenient manipulation, prevents chafing of the collar by the knob, and the same from being accidentally broken off or pushed back, as liable if exposed to contact with adjacent parts of harness. The location of the slot upon side also admits of the link being cast without a core, by which considerable reduction is effected in cost of manufacture. It is also preferable that the snap-link should be attached to hame-ring hook downward, so that the length of breast-chain may be adjusted by taking up or letting out the various links as required.

I do not claim, broadly, snap-hooks having the form of chain-links, as I am aware that the same have previously been used; neither do I claim the operative parts that are embraced in previous patents issued to me otherwise than as hereinbefore specified; but What I do claim, and desire to secure by Letters Patent, is—

As a chain-connection in harness, the snap-hook link A, having the longitudinally-sliding spring-bolt $d$, provided with retracting-knob $e$, in combination with the breast-chain and hame-rings of said harness to co-operate therewith, as described, for the objects herein set forth.

JAMES C. COVERT.

Witnesses:
H. LISLE FLEMING,
L. R. BECKLEY.